(12) United States Patent
Peteri et al.

(10) Patent No.: US 7,451,027 B2
(45) Date of Patent: Nov. 11, 2008

(54) VEHICLE AND METHOD FOR STEERING THEREOF

(75) Inventors: Paul Henri Frans Peteri, Ll Rotterdam (NL); Ralf Siebert, Jk Hoevelaken (NL)

(73) Assignee: Frog Navigation Systems B.V. (NL)

( * ) Notice: Subject to any disclaimer, the term of this patent is extended or adjusted under 35 U.S.C. 154(b) by 232 days.

(21) Appl. No.: 10/493,008

(22) PCT Filed: Oct. 17, 2002

(86) PCT No.: PCT/NL02/00661

§ 371 (c)(1),
(2), (4) Date: Aug. 23, 2004

(87) PCT Pub. No.: WO03/033330

PCT Pub. Date: Apr. 24, 2003

(65) Prior Publication Data

US 2005/0015187 A1    Jan. 20, 2005

(30) Foreign Application Priority Data

Oct. 18, 2001    (NL) .................................... 1019191

(51) Int. Cl.
*A01B 69/00* (2006.01)
(52) U.S. Cl. .............................. 701/41; 701/23; 701/34; 180/167; 180/168
(58) Field of Classification Search .................. 701/23, 701/33, 36, 41, 35, 34; 180/167, 168, 169
See application file for complete search history.

(56) References Cited

U.S. PATENT DOCUMENTS

| | | | | |
|---|---|---|---|---|
| 4,777,601 A * | 10/1988 | Boegli | .......................... | 701/23 |
| 5,347,456 A * | 9/1994 | Zhang et al. | .................. | 701/23 |
| 5,809,440 A * | 9/1998 | Beck et al. | ..................... | 701/50 |
| 5,938,704 A * | 8/1999 | Torii | ............................ | 701/23 |
| 6,512,978 B2 * | 1/2003 | Suzuki | ....................... | 701/207 |
| 2001/0047690 A1 * | 12/2001 | Baba et al. | ............... | 73/514.34 |

FOREIGN PATENT DOCUMENTS

| | | |
|---|---|---|
| FR | 2 752 807 | 3/1998 |
| JP | 08 271269 | 10/1996 |

* cited by examiner

*Primary Examiner*—Gertrude Arthur Jeanglaud
(74) *Attorney, Agent, or Firm*—Ostrolenk, Faber, Gerb & Soffen, LLP

(57) ABSTRACT

The present invention relates to a method for steering a vehicle (1) over a ground surface (4), wherein magnetic marking elements (5) are arranged in the ground surface at predetermined locations and wherein the vehicle is provided with a number of sensors (3) arranged adjacently of each other in transverse direction of the vehicle, wherein during travel of the vehicle the substantially vertical components of the magnetic field is measured in each of the sensors, and wherein on the basis of the intensities of magnetic field measured by the sensors an estimation is made of the position of these sensors relative to the magnetic marking elements, and thus of the vehicle relative thereto.

18 Claims, 25 Drawing Sheets

| Pos | Code |
|-----|------|
| 1   | 01   |
| 2   | 11   |

| 0 | 0 | 0 | 1 | 0 | 0 | 0 | 1 | 1 | 0 | 0 | 0 |
|---|---|---|---|---|---|---|---|---|---|---|---|
| 0 | 0 | 0 | => | | | | | | | | |

| Pos |
|-----|
| ?   |

| 0 | 0 | 0 | 1 | 0 | 0 | 0 | 1 | 1 | 0 | 0 | 0 |
|---|---|---|---|---|---|---|---|---|---|---|---|
| | 0 | 0 | 1 | => | | | | | | | |

| Pos |
|-----|
| ?   |

| 0 | 0 | 0 | 1 | 0 | 0 | 0 | 1 | 1 | 0 | 0 | 0 |
|---|---|---|---|---|---|---|---|---|---|---|---|
| | | 0 | 1 | 0 | => | | | | | | |

| Pos |
|-----|
| 1   |

| 0 | 0 | 0 | 1 | 0 | 0 | 0 | 1 | 1 | 0 | 0 | 0 |
|---|---|---|---|---|---|---|---|---|---|---|---|
| | | | 1 | 0 | 0 | => | | | | | |

| Pos |
|-----|
| ?   |

| 0 | 0 | 0 | 1 | 0 | 0 | 0 | 1 | 1 | 0 | 0 | 0 |
|---|---|---|---|---|---|---|---|---|---|---|---|
| | | | | 0 | 0 | 0 | => | | | | |

| Pos |
|-----|
| ?   |

| 0 | 0 | 0 | 1 | 0 | 0 | 0 | 1 | 1 | 0 | 0 | 0 |
|---|---|---|---|---|---|---|---|---|---|---|---|
| | | | | | 0 | 0 | 1 | => | | | |

| Pos |
|-----|
| ?   |

| 0 | 0 | 0 | 1 | 0 | 0 | 0 | 1 | 1 | 0 | 0 | 0 |
|---|---|---|---|---|---|---|---|---|---|---|---|
| | | | | | | 0 | 1 | 1 | => | | |

| Pos |
|-----|
| 2   |

| 0 | 0 | 0 | 1 | 0 | 0 | 0 | 1 | 1 | 0 | 0 | 0 |
|---|---|---|---|---|---|---|---|---|---|---|---|
| | | | | | | | 1 | 1 | 0 | => | |

| Pos |
|-----|
| ?   |

| 0 | 0 | 0 | 1 | 0 | 0 | 0 | 1 | 1 | 0 | 0 | 0 |
|---|---|---|---|---|---|---|---|---|---|---|---|
| | | | | | | | | 1 | 0 | 0 | => |

| Pos |
|-----|
| ?   |

| 0 | 0 | 0 | 1 | 0 | 0 | 0 | 1 | 1 | 0 | 0 | 0 |
|---|---|---|---|---|---|---|---|---|---|---|---|
| | | | | | | | | | 0 | 0 | 0 |

| Pos |
|-----|
| ?   |

FIG. 13

| Pos | Code |
|---|---|
| 1 | 01 |
| 2 | 11 |

| 0 | 0 | 0 | 0 | 0 | 0 | 0 | 1 | 0 | 0 | 0 | 0 |
|---|---|---|---|---|---|---|---|---|---|---|---|
| 0 | 0 | 0 | 1 | 0 | 0 | 0 | 1 | 0 | 0 | 0 | 0 |

| 0 |
|---|
| 0 |

⇒

| Pos |
|---|
| ? |

| 0 | 0 | 0 | 0 | 0 | 0 | 0 | 1 | 0 | 0 | 0 | 0 |
|---|---|---|---|---|---|---|---|---|---|---|---|
| 0 | 0 | 0 | 1 | 0 | 0 | 0 | 1 | 0 | 0 | 0 | 0 |

| 0 |
|---|
| 1 |

⇒

| Pos |
|---|
| 1 |

| 0 | 0 | 0 | 0 | 0 | 0 | 0 | 1 | 0 | 0 | 0 | 0 |
|---|---|---|---|---|---|---|---|---|---|---|---|
| 0 | 0 | 0 | 1 | 0 | 0 | 0 | 1 | 0 | 0 | 0 | 0 |

| 0 |
|---|
| 0 |

⇒

| Pos |
|---|
| ? |

| 0 | 0 | 0 | 0 | 0 | 0 | 0 | 1 | 0 | 0 | 0 | 0 |
|---|---|---|---|---|---|---|---|---|---|---|---|
| 0 | 0 | 0 | 1 | 0 | 0 | 0 | 1 | 0 | 0 | 0 | 0 |

| 0 |
|---|
| 0 |

⇒

| Pos |
|---|
| ? |

| 0 | 0 | 0 | 0 | 0 | 0 | 0 | 1 | 0 | 0 | 0 | 0 |
|---|---|---|---|---|---|---|---|---|---|---|---|
| 0 | 0 | 0 | 1 | 0 | 0 | 0 | 1 | 0 | 0 | 0 | 0 |

| 1 |
|---|
| 1 |

⇒

| Pos |
|---|
| 2 |

| 0 | 0 | 0 | 0 | 0 | 0 | 0 | 1 | 0 | 0 | 0 | 0 |
|---|---|---|---|---|---|---|---|---|---|---|---|
| 0 | 0 | 0 | 1 | 0 | 0 | 0 | 1 | 0 | 0 | 0 | 0 |

| 0 |
|---|
| 0 |

⇒

| Pos |
|---|
| ? |

FIG. 14

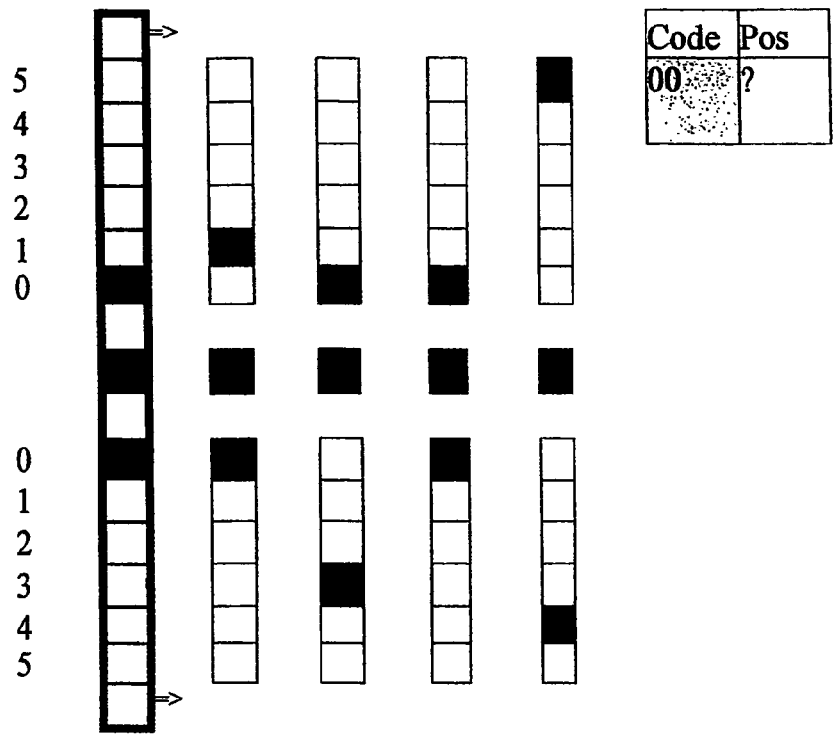
FIG. 15A
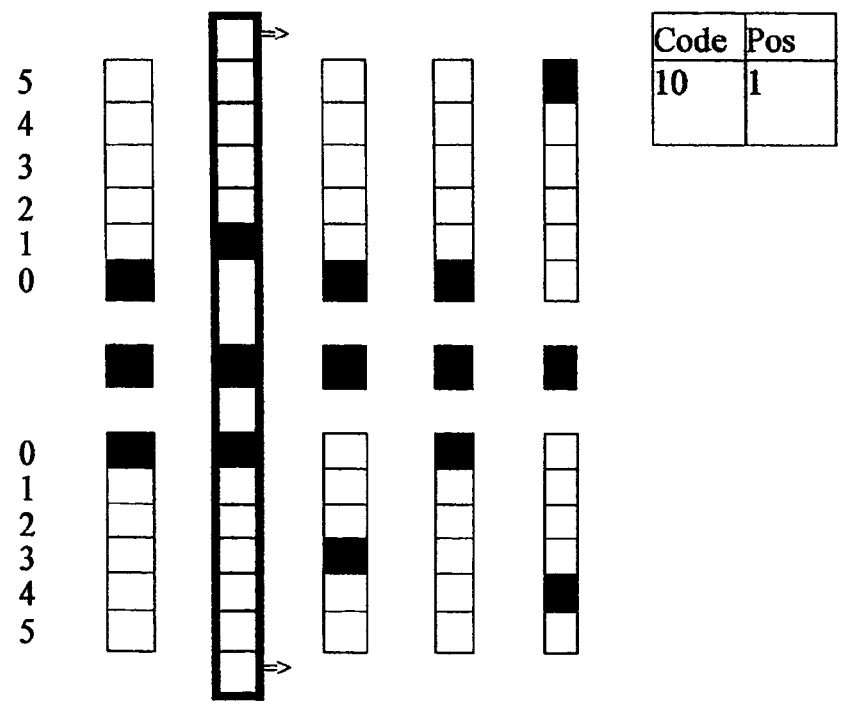

VEHICLE AND METHOD FOR STEERING THEREOF

BACKGROUND OF THE INVENTION

Applicant markets (unmanned) vehicles for diverse purposes, such as unmanned transport of containers in harbour areas and vehicles for people, so-called people movers, for transport over and to and from car parks.

The American patent U.S. Pat. No. 5,347,465 describes a system wherein sensors measure the vertical and lateral components of a magnetic field of magnets arranged in the road surface. Using a table showing the relations between the vertical and lateral components of the magnetic field, the transverse distance relative to the magnets can be determined in each case when they are passed. In this known system it is necessary for an automobile equipped with such a system to be situated within certain limits above the (straight or curved) line of magnets. The lateral components of the magnetic field can moreover not be measured precisely because of the terrestrial magnetic field, which can be a particular problem when driving the vehicle through bends.

In the Netherlands patent application 1008587 a line of magnets also has to be followed by the vehicle. The transverse position of the vehicle relative to the line of magnets is determined by the ratio of the two mutually perpendicular horizontal field components. Particularly because of the uncertain outcomes in the case the sensor is situated directly above the magnets, this known sensor system must be combined with an accurate measurement of the path covered, which makes this known sensor system complex and moreover makes it dependent on possible slip and/or other geometric effects. In this known system the possible deviation of the vehicle relative to the line of magnetic marking elements is also limited.

SUMMARY OF THE INVENTION

The present invention has for its object to provide a method and vehicle wherein the above stated problems of the known systems are obviated, and wherein a greater lateral deviation of the vehicle relative to the magnetic marking elements is possible, while the measurements take place using a compact measuring system which can be arranged on vehicles for diverse applications at desired heights relative to the road surface.

According to a first aspect the present invention provides a method for steering a vehicle over a ground surface, wherein magnetic marking elements are arranged in the ground surface at predetermined locations and wherein the vehicle is provided with a number of sensor elements arranged adjacently of each other in transverse direction of the travel direction of the vehicle, wherein during travel of the vehicle the substantially vertical field component is measured in at least a number of the sensor elements, and wherein on the basis of intensities of magnetic field measured by the sensor elements an estimation is made of the position of these sensor elements relative to the magnetic marking elements, and thus of the vehicle relative thereto.

According to a further aspect the present invention provides a vehicle provided with a number of sensor elements arranged mutually adjacently for sensing the intensity of magnetic field of the magnetic marking elements arranged in the ground surface and computer means which are connected to the sensor elements and which are connected on the other side to signals which come from the vehicle elements and which represent, among other things, the path covered and the steering wheel movement of the vehicle.

In a preferred embodiment the magnetic sensors are arranged over a considerable part of the width of the vehicle so that the planned path of the vehicle is limited as little as possible by the placing of the magnets. In an application where a separate section of road is driven over at relatively high speeds, the number of marking elements to be arranged in the ground surface can remain limited, while hazardous situations can be avoided.

If the sensor elements are sampled with a frequency in the order of magnitude of 20 kHz to 1 MHz, a sufficient number of measurements is available with 100 sensors to make an accurate estimation of the position of the vehicle.

In a further preferred embodiment the vehicle is provided with a microcomputer for performing the estimation calculation as well as the scanning of the sensors. Such a vehicle is preferably provided with a so-called FROG control computer from applicant in addition to the so-called CAN system which is well known in vehicle engineering, to which two systems the microprocessor for performing the method according to the present invention is then connected.

The present invention further provides a system for measuring the position of a magnet relative to a number of sensor elements arranged at predetermined mutual distances, wherein a substantially vertical component of the intensity of magnetic field is sensed by one or more sensor elements during passage thereover, and wherein the position of the magnet relative to the sensor elements is estimated on the basis of the signals coming from the sensor elements.

BRIEF DESCRIPTION OF THE DRAWING

Further advantages, features and details of the present invention will be elucidated on the basis of the following description with reference to the accompanying drawings, in which:

FIG. 13 shows a diagram elucidating a code based on magnet orientation;

FIG. 14 shows a diagram of a code based on magnet orientation, wherein a plurality of magnets are placed adjacently of each other;

DESCRIPTION OF THE PREFERRED EMBODIMENTS

Figure 1:
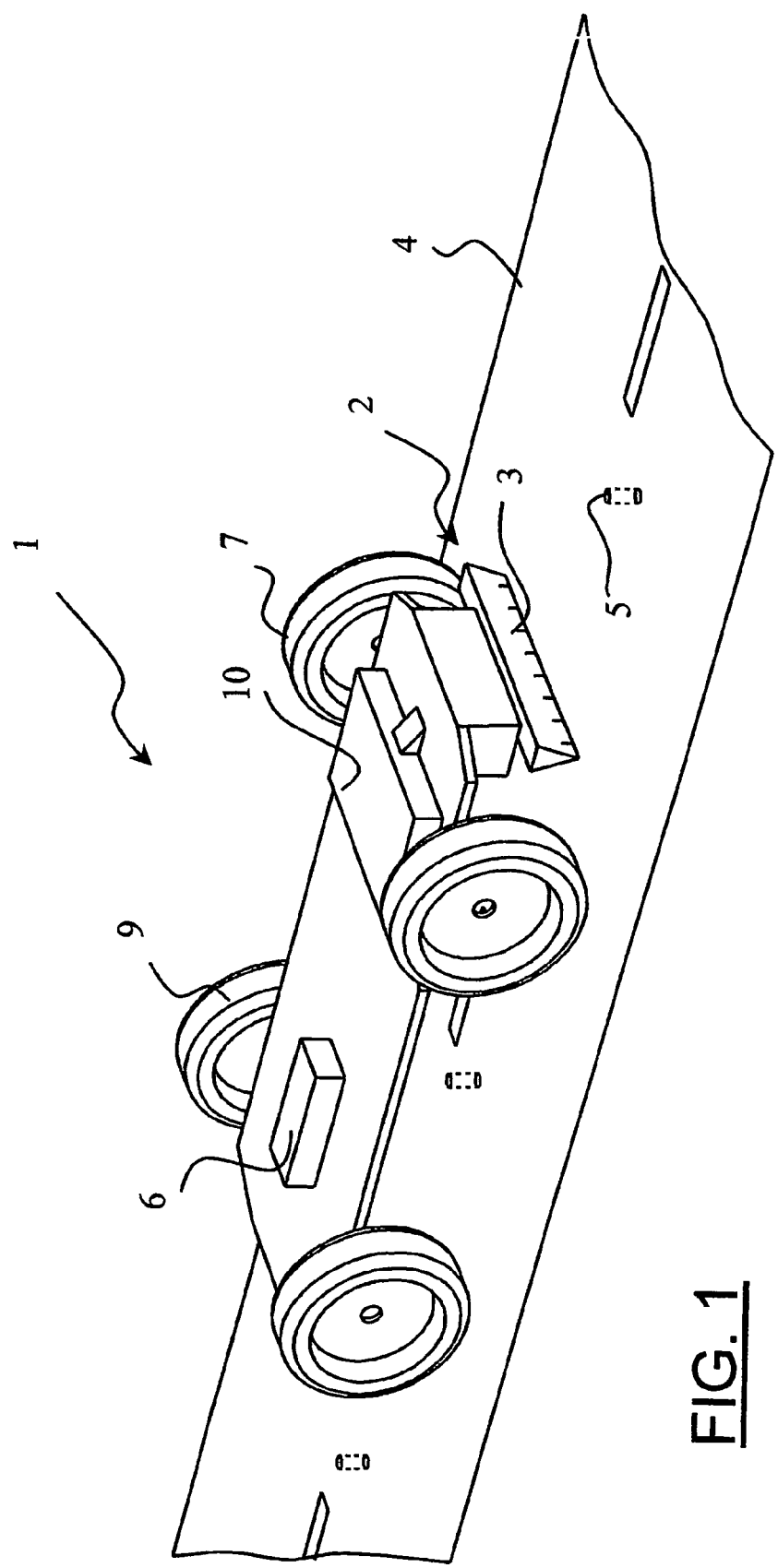
FIG. 1 shows a partly schematic view in perspective of a first preferred embodiment of a vehicle according to the present invention.

A vehicle 1 (FIG. 1) is provided at the front with a beam 2 in which are arranged schematically designated magnetic sensors 3, for instance numbering 96, which beam extends along at least a considerable width of the vehicle, for instance 1 to 1.5 metres. Sensors 3, for instance as available commercially from MAX Stegman GmbH, are sensitive to the intensity of magnetic field of permanent magnets 5 which are arranged in a road surface 4 and which have for instance a cylindrical form with a diameter of 15 mm and a height of 30 mm so that the field intensity is sufficiently high for measurement at a height of for instance 30 cm from the road surface, where the field strength can then still amount to for instance 1 Gauss. When the application makes it desirable to measure the intensity of magnetic field at a greater or, conversely, smaller height above the road surface, respectively larger or smaller magnets can be used. Vehicle 1 is further provided with a schematically designated control computer 6 which includes processing electronics, such as an Intel Processor 486 with associated memory elements and the like. The vehicle is further provided with front wheels 7 and rear wheels 9, of which the front wheels 7 can be steered using a steering motor 10 actuated by control computer 6, as indicated schematically in FIG. 1.

Figure 2:
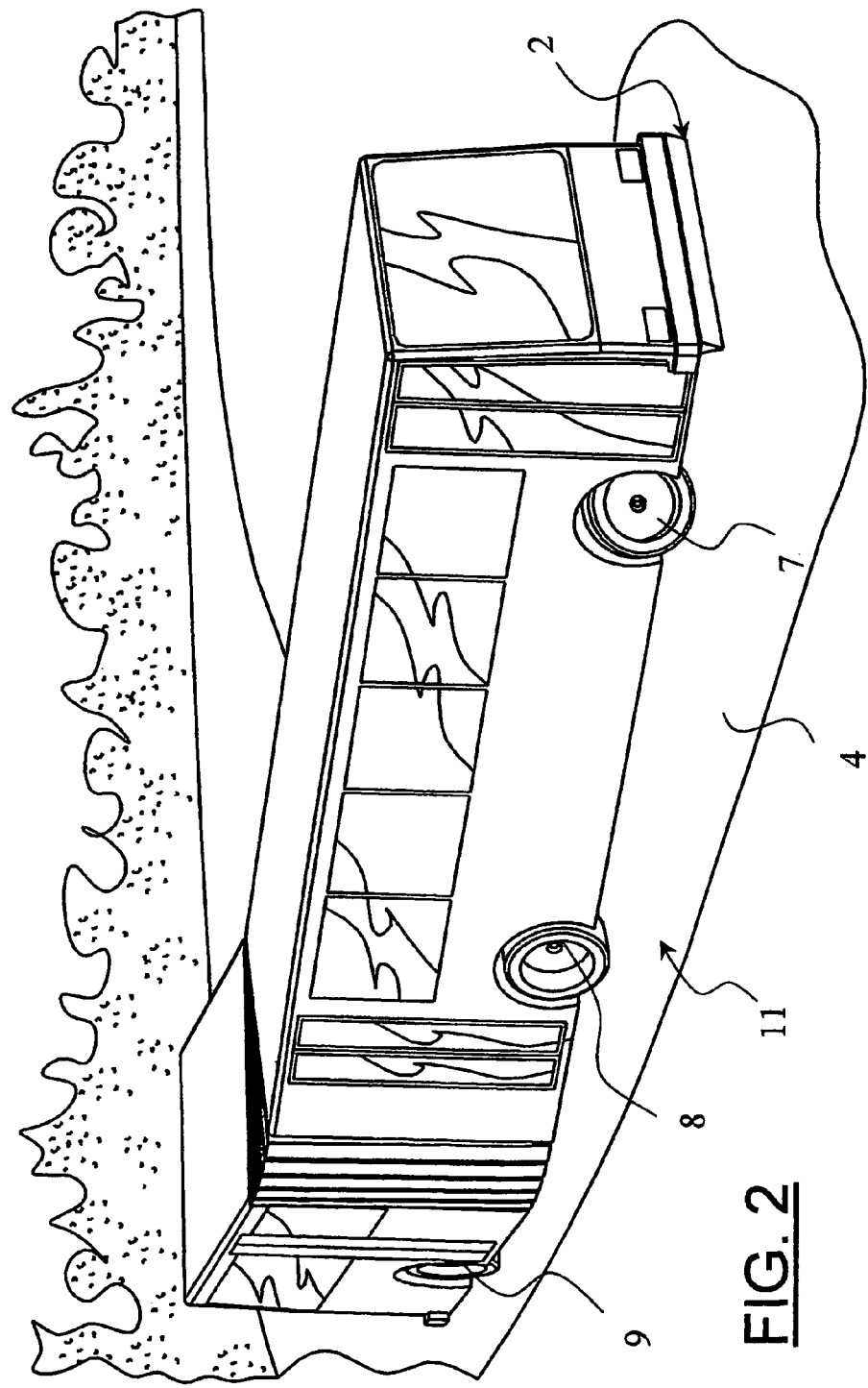
FIG. 2 shows a view in perspective of a second preferred embodiment of a vehicle according to the present invention.

Another preferred embodiment of the vehicle according to the present invention, wherein the method according to the present invention can also be applied, relates to a(n) (articulated) bus 11 (FIG. 2), for instance for High-quality Public Transport (HPT), which in addition to front and rear wheels 7 and 9 is also provided with middle wheels 8, while in an advanced application these middle wheels (and the rear wheels) can be steered so that such a vehicle can travel in crab manner. Such a vehicle can travel for instance at a speed of about 30 m/s (about 100-120 km/h), while at stops or so-called platforms a greater accuracy may be desirable of for instance 10 mm, so that a wheelchair user can ride into the bus without problem from the platform situated at the same height as the floor of the bus.

Figure 3:
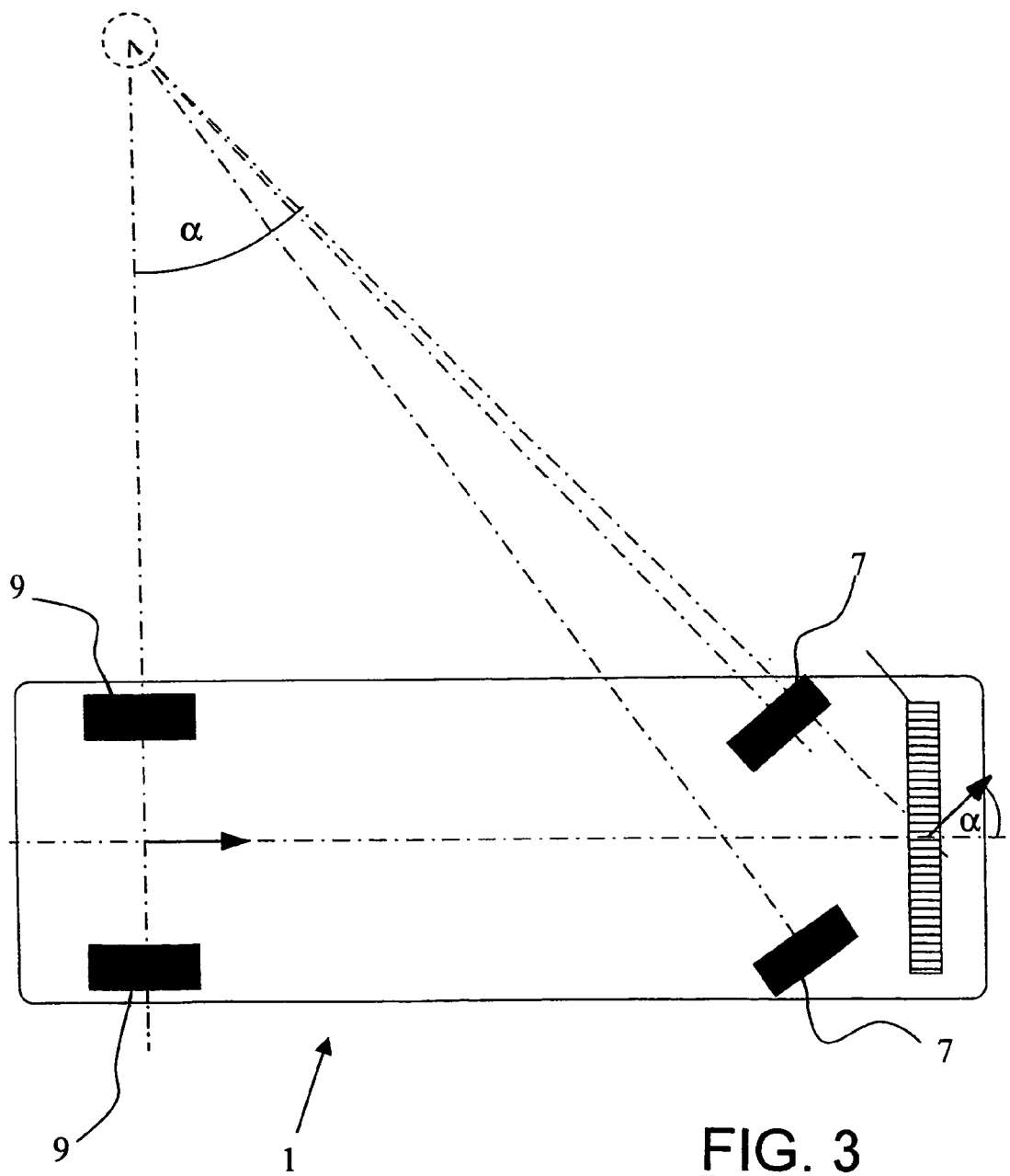
FIG. 3 shows a schematic top view of the vehicle of FIG. 1.
Figure 4:
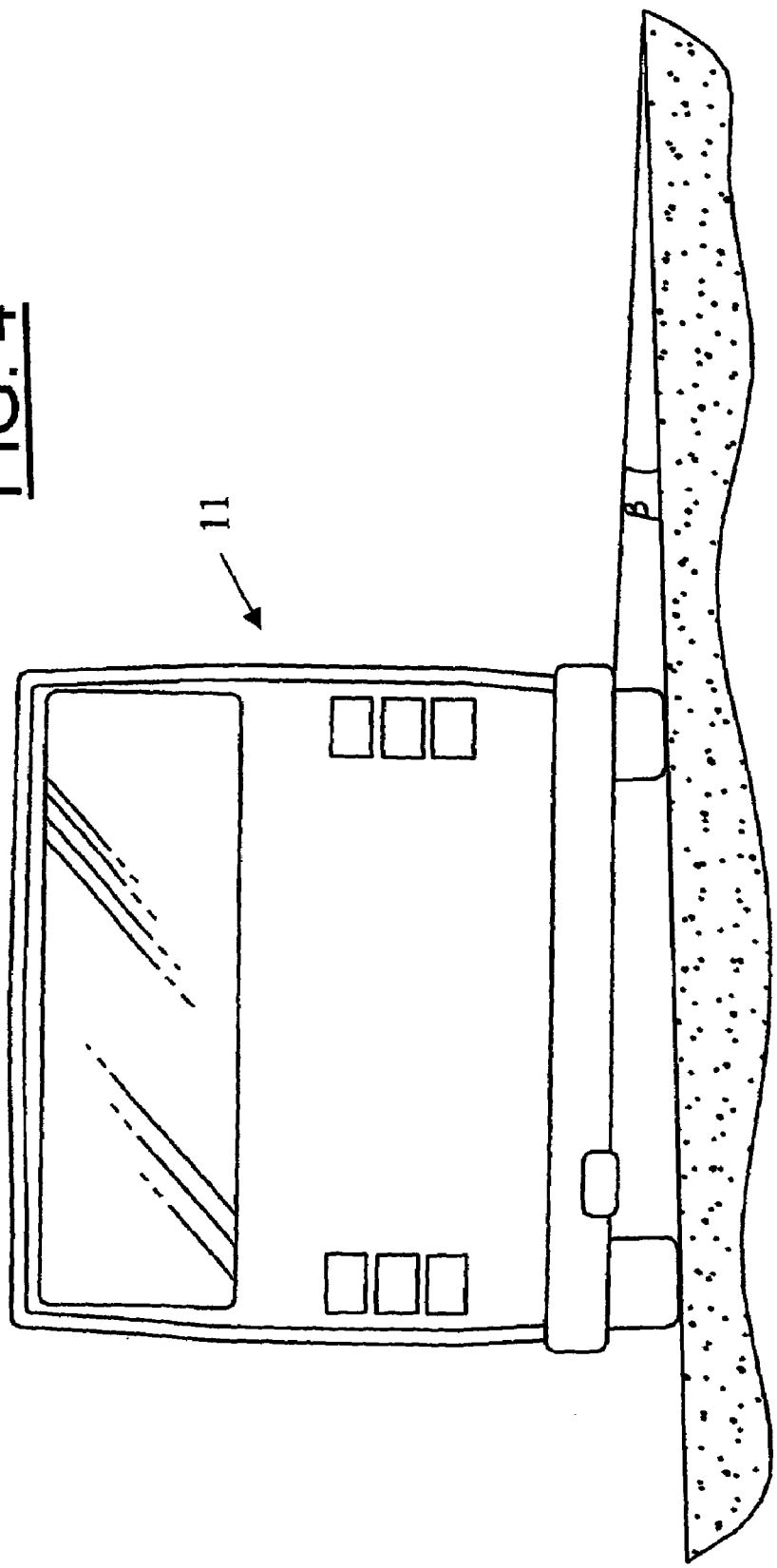
FIG. 4 is a schematic front view of the vehicle of FIG. 2.

To make the following description clearer the turning angle α of the magnet sensors of vehicle 1 is also shown in FIG. 3, while the rolling angle (or inclining position) β relating to vehicle 11 is shown in FIG. 4.

Figure 5:
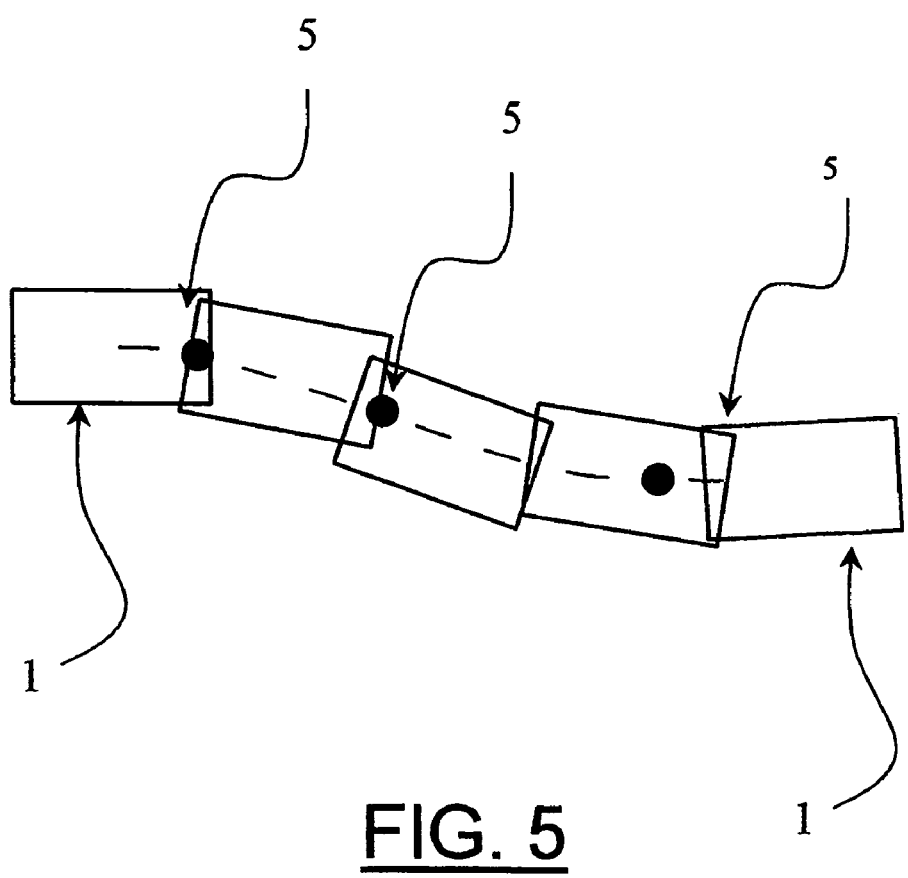
FIG. 5 shows a schematic top view of a preferred embodiment of the method according to the present invention.

FIG. 5 shows how vehicle 1 passes over magnets 5 during travel on its preplanned route. As long as the vehicle drives over the magnets during travel along the route, the relative position of the magnets relative to the vehicle can be determined. The magnets thus serve to correct the position estimated by the vehicle control. The path of the vehicle does not therefore have to run over the imaginary line connecting the magnets.

Figure 6:
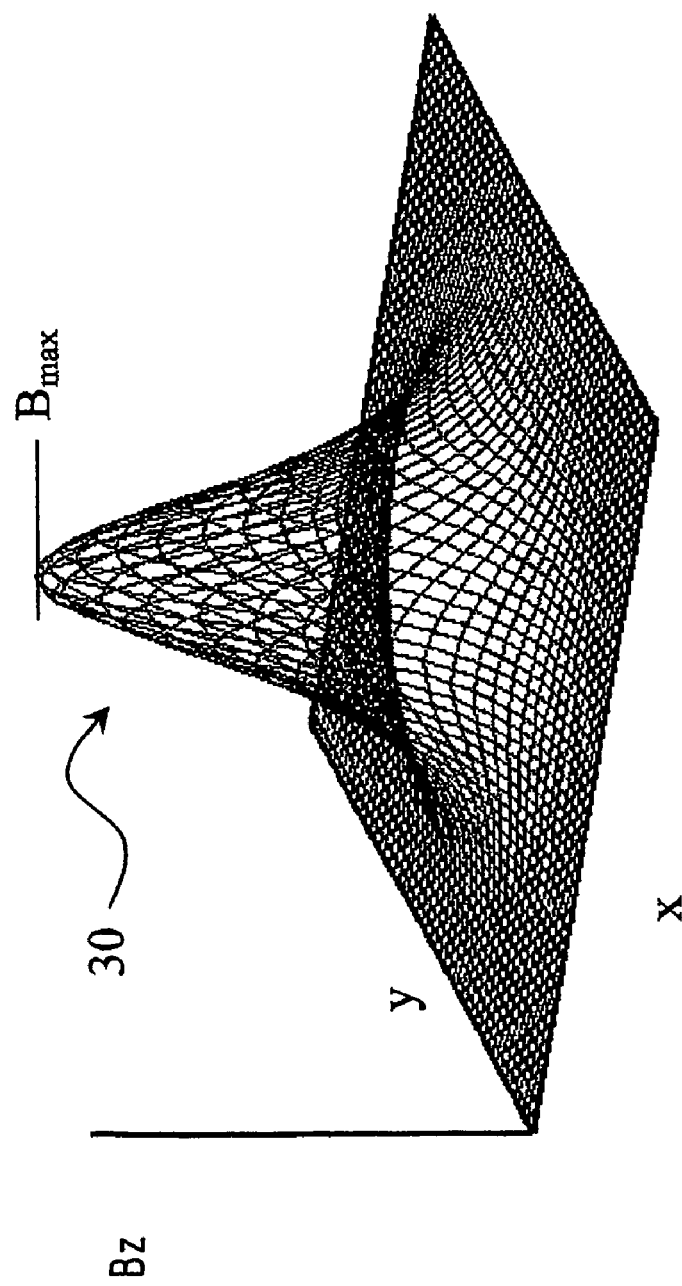
FIG. 6 is a view in perspective of the two-dimensional (x,y) graph of the vertical component of the intensity of magnetic field at a determined distance above a magnet.

The substantially cylindrical permanent magnets arranged in the ground have a rotation-symmetrical field relative to the axis of symmetry of the magnet. The z-component of this field for a determined measuring height z is shown in FIG. 6. The maximum $B_{max}$ coincides with the position in the flat (x,y) plane of the axis of the magnet. The value of $B_{max}$ is determined by the magnetic force and the measuring height z. As z increases, $B_{max}$ decreases sharply.

An advantage of measuring the vertical (z) component of the magnetic field results from the fact that such a measurement is not influenced by the direction-dependent horizontal component of the terrestrial magnetic field. Particularly during travel in bends a $B_z$ measurement therefore provides a more accurate measurement.

Figure 7:
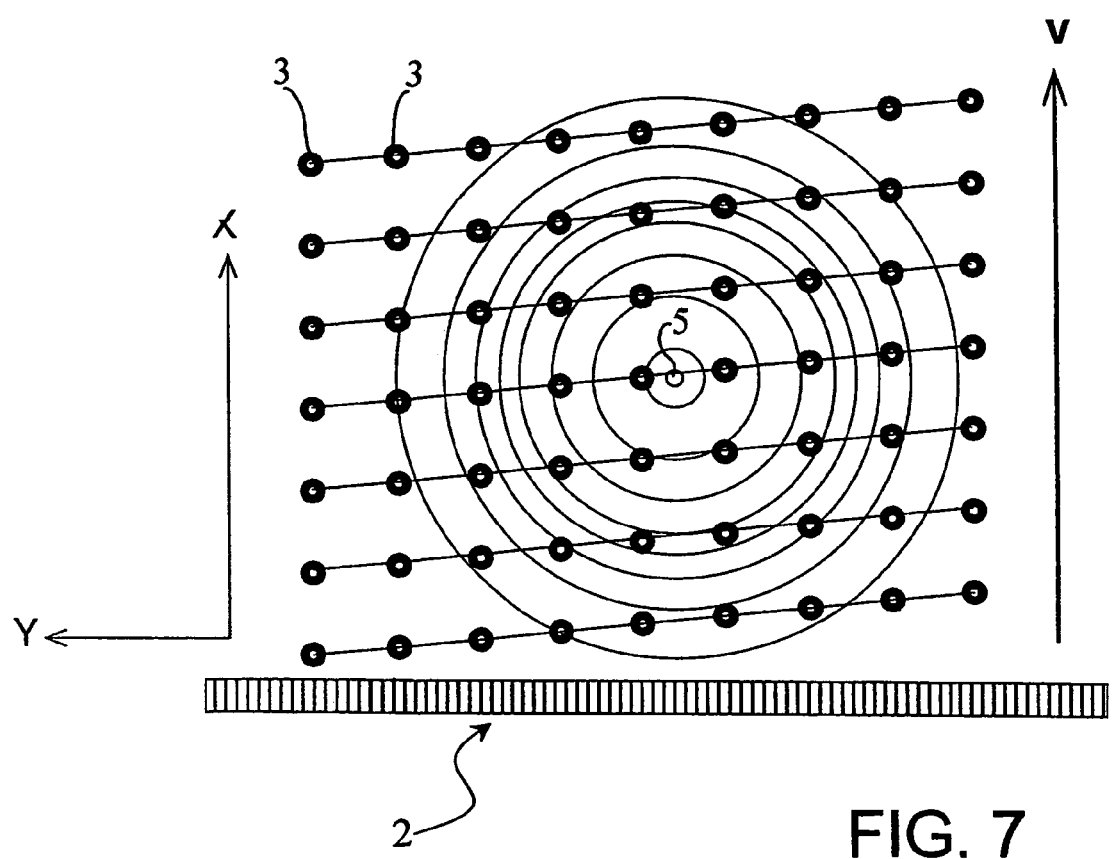
FIG. 7 shows a diagram elucidating a preferred embodiment of the method, wherein the vehicle moves at a constant speed straight ahead.

During passage over a magnet 5 (FIG. 7) the area of the magnets above the road surface is scanned by the magnetic sensors designated as closed circles, of which only nine in a row are shown in FIG. 7. In a practical embodiment the number can be in the order of magnitude of 50-100. At a sampling frequency of for instance about 50 kHz there can then be a scan over the full width available every 6 cm. At a height of about 30 cm the magnetic field has for instance a detectable range of 30-50 cm, so that at least five scans are available of every magnet. Depending on the specific application, the sampling frequency can be chosen in a range of 20 kHz to 1 Mhz. The highest possible frequency provides advantages, for instance for making a so-called snapshot, a large number of scans at for instance the position of the magnet, and a higher maximum speed of the vehicle. From considerations of cost a choice has been made in the present embodiment for a frequency of 50 kHz.

Figure 8:
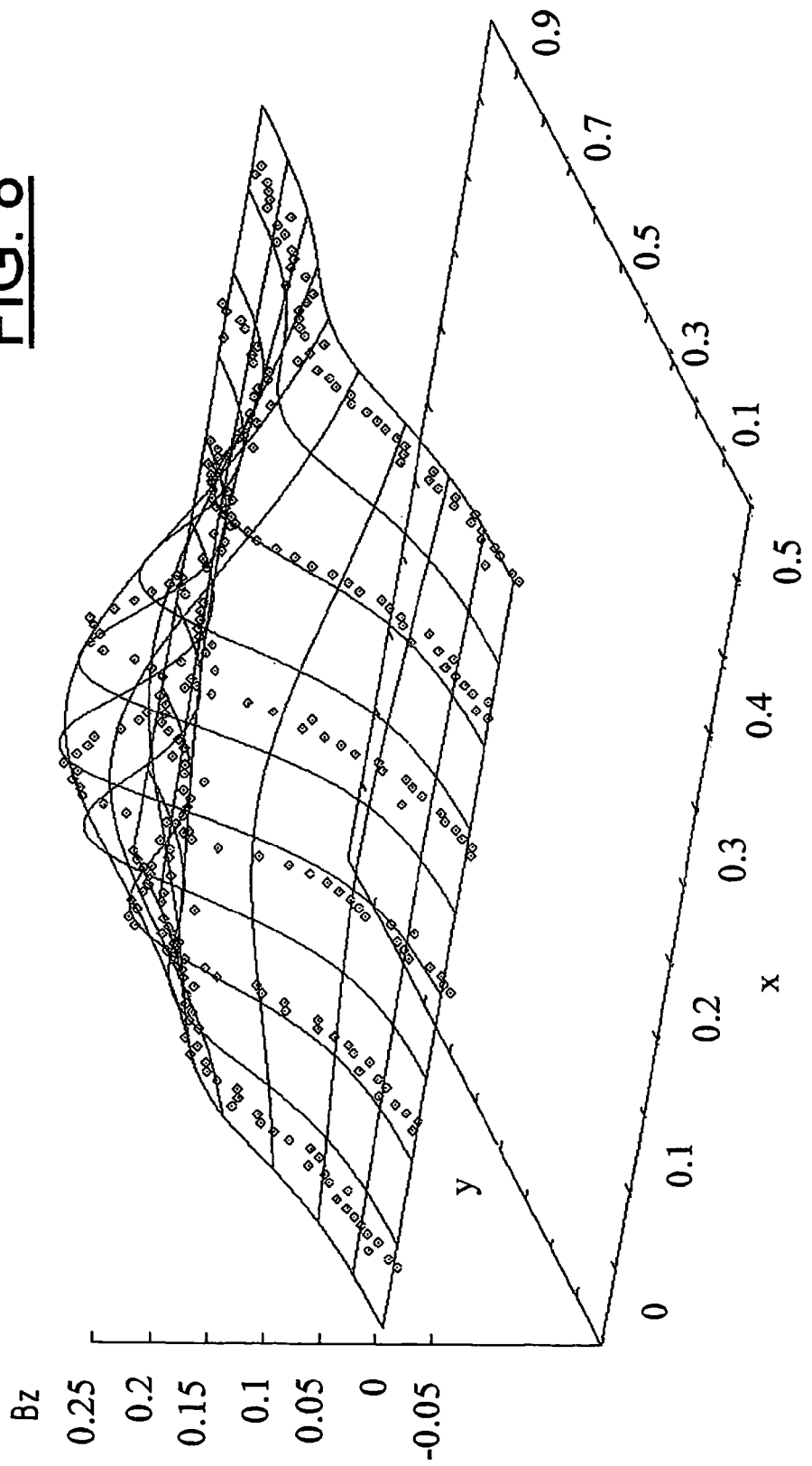
FIG. 8 is a view in perspective of measurements and magnet model explaining the preferred embodiment of the method according to the present invention.

The received measurement values are processed in the processing electronics in order to estimate the position of the measuring beams, and therefore the vehicle, relative to the magnet on the basis of the information relating to the intensity of magnetic field, and in particular the z-component thereof (see FIG. 6 in the description above). During the interactive estimation it can be assumed as first estimation for instance that the magnet is situated directly under the sensor with the highest measured value, while the nominal measuring height can be taken as first estimation for the height z. Using known estimating methods such as series expansions, minimum variance estimators, least squares methods and the like, an optimal fit of the model to the measured values can be obtained. The intensity $B_{max}$ can also be derived from such a fit. An example of fitting a set of measurements to a model of $B_z$ is shown in FIG. 8, wherein the fit of the $B_z$ model is shown in linear form and the spatial (x,y) distribution of the $B_z$ measurements is shown by dots. The vertical axis is a measure of the intensity of magnetic field.

Figure 9:
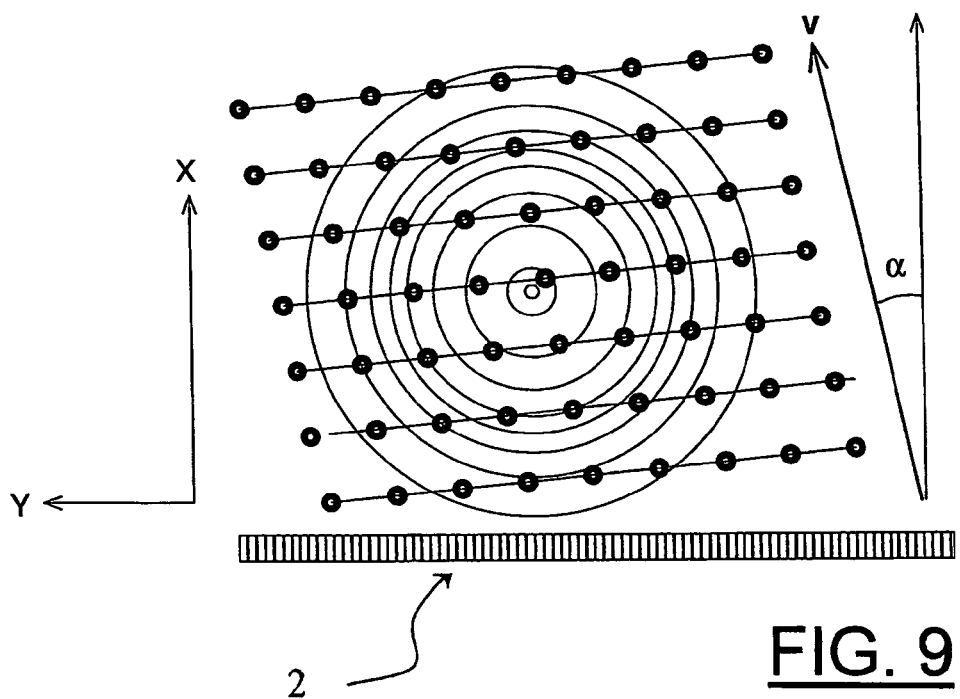
FIG. 9 shows a diagram of a preferred embodiment of the method, wherein the vehicle negotiates a bend.

If the vehicle and the measuring beam negotiate a bend when passing over a magnet 5 (FIG. 9), the movement of the measuring beam at assumed constant speed and steering angle can be shown in first approximation by FIG. 9, wherein the direction of v corresponds with the turning angle α of FIG. 6. Disregarding the rotation during the magnet passage is permissible in many cases. Such an approximation simplifies the estimation calculations while sufficient accuracy is found to be realized in practice. It very certainly cannot be precluded that more complicated calculations, wherein said simplification is not applied, will result in the desired outcome in sufficiently short time.

Figure 10:
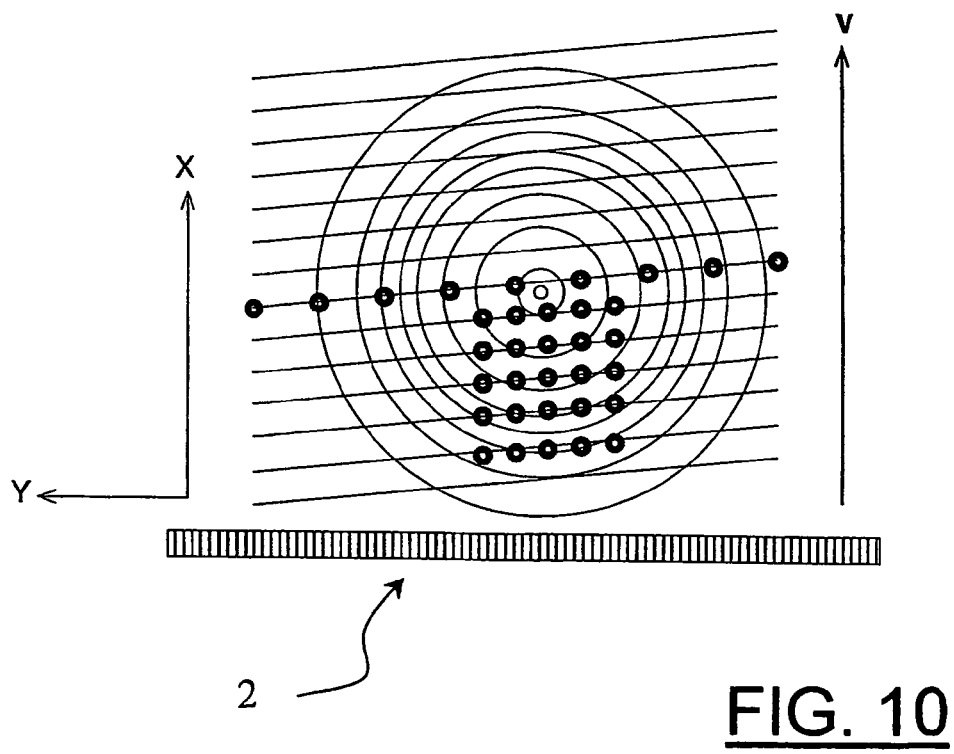
FIG. 10 shows a diagram of a further preferred embodiment of the method according to the present invention.

If prior knowledge is available about the positions of the vehicle, for instance during slow and precise manoeuvring of the vehicle along a number of magnets arranged at relatively small mutual distance, it is possible to suffice with reading only a small number of sensors close to this known y position (FIG. 10). The time for measuring and estimating is thus limited while accuracy is increased.

It is likewise possible, in a manner which is not shown, to not read all successive sensors, for instance every second, third, fourth etc. The processing electronics are preferably designed such that they select the optimal possibility from the above stated on the basis of the measuring conditions in respect of travel speed, bend radius, measuring height, interference fields and the like.

The processor unit comprises processing electronics for running software. The electronics are for instance formed by a microcomputer with Intel 486 processor, hard disk and memories in the form of RAM and ROM, in addition to one or more analog-digital converters for converting measurement values coming from the measuring beam 2 with sensors 3 shown schematically in FIGS. 11 and 12.

Figure 11:
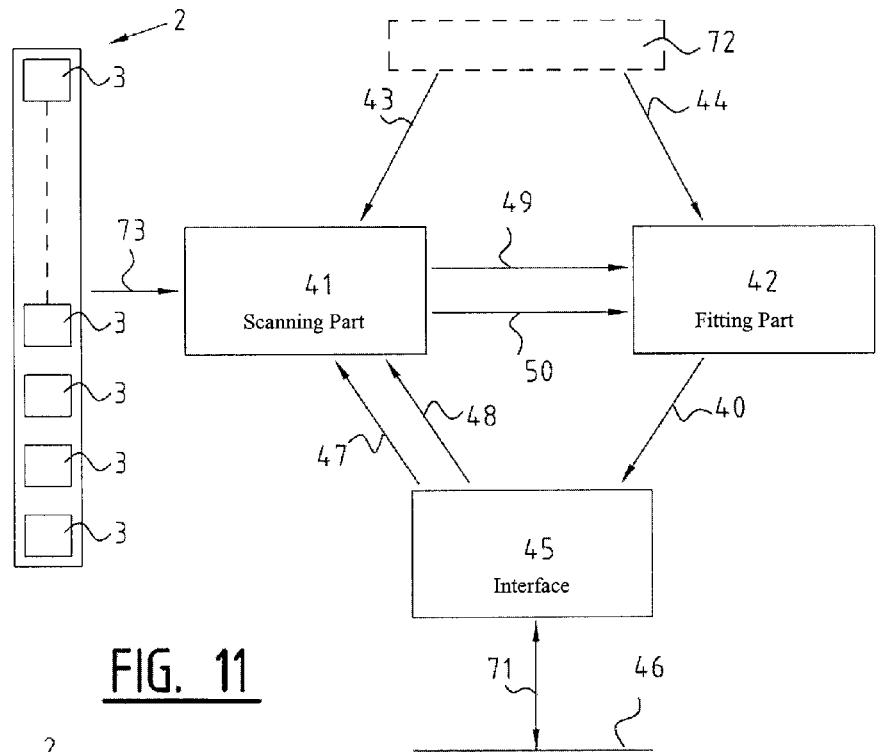
FIG. 11 shows a block diagram elucidating a preferred embodiment of the method according to the present invention.
Figure 12:
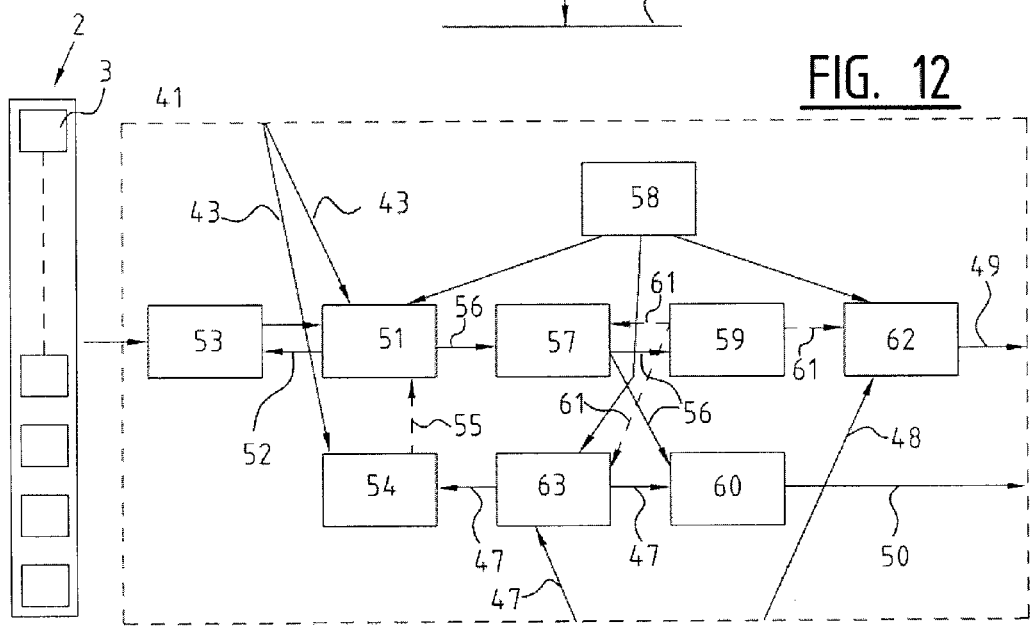
FIG. 12 shows a block diagram in more detail of a part of the block diagram of FIG. 11.

In the preferred embodiment according to FIG. 11, the software for the above stated hardware comprises a scanning part 41 and a fitting part 42. Part 45 relates to an interface (I/O) with a bus system CAN which is usual in automobile systems and which is designated as 47. From this interface information is supplied to the scanning part, in any case a relativity via SYNC 48 and optionally the speed 47 of the vehicle. Measurement data obtained in scanning part 41 is fed as according to arrows 49 and 50 to the fitting part 42. Both the scanning part and the fitting part receive information from the so-called Frog control computer of the vehicle which provides wholly or partially unmanned steering of the vehicle, so that the information obtained from the vehicle system can be compared to the information received from the control computer in order to increase accuracy.

In more detail, the scanning program (FIG. 12) comprises a driver for the data acquisition control, a program for the memory control, a trigger routine 59 and a SYNC routine 62, in addition to a driver for the analog-digital converter 53, a synchronization program, a further memory control routine 63 and a selection program 60.

The speed information obtained from interface 45 is stored in memory 63, while the synchronization or time information 48 is processed in SYNC locking unit 62, wherein both components are connected to system clock 58.

The analog information started by the control and obtained from the measuring beam is digitized in A/D converter 53 and then fed continuously to memory 57. The analog information is likewise fed to trigger unit 59 which detects whether the measured value exceeds a determined level, for instance the level of background noise. When such a level is exceeded, memory 57 is activated so that scan information 56 is stored therein.

Simultaneously activated is memory 63 in which movement information 47 is stored. Once sufficient scans have been collected, the (scan) information from 57 is related in mapping module 60 to the measurement positions using (movement) information stored in memory 63.

The thus obtained spatial field information $(x,y,B_z)$, marked with numeral 50, is then supplied to the fitting part as described above, as is the SYNC locking signal 49 with the required time window number.

The magnetic sensors are able to distinguish between differently oriented magnets, whereby it becomes possible to place codes using the magnets in the road surface. If a magnet with its north pole upward represents a zero and a magnet with its south pole upward represents a one, diverse methods of coding can thus be implemented by the manner of placing the magnets. One coding option is to keep track of the orientation of at least a number of the magnets passed, whereby a series of ones and zeros is obtained (FIG. 13). The measured series of for instance three ones and zeros is now compared to the known series of all ones and zeros, wherein the series length and the orientation of the magnets can be chosen such that unique combinations, representing position information and/or other information, are created in the series. A possible coding wherein a single magnet at a time is placed at determined distances in the road surface comprises for instance two unique codes representing a position, wherein position 1 has the code 01 and position 2 the code 11. This orientation-based coding relates for instance to storing in a memory the last three passed magnet orientations, wherein these three orientations are compared in each case to the known series so that the position codes in the series are identified (FIG. 13). The magnet orientations forming a code are given a darker colour in the figure, while the other magnets represent a 0, whereby it is possible to define the marked positions unambiguously.

In a further coding two or more magnets are placed mutually adjacently in the road surface, wherein the sensors detect these magnets almost simultaneously. More codes thus become available per position, wherein the number of possible codes is $2^n$, with n being the number of magnets placed adjacently of each other. FIG. 14 shows a series wherein two magnets are placed mutually adjacently, so that $2^2=4$ codes are possible. The measured code is compared to the known series. Due to the increased number of codes per position an unambiguous position marking can already be obtained after only one magnet passage.

Figure 15B:
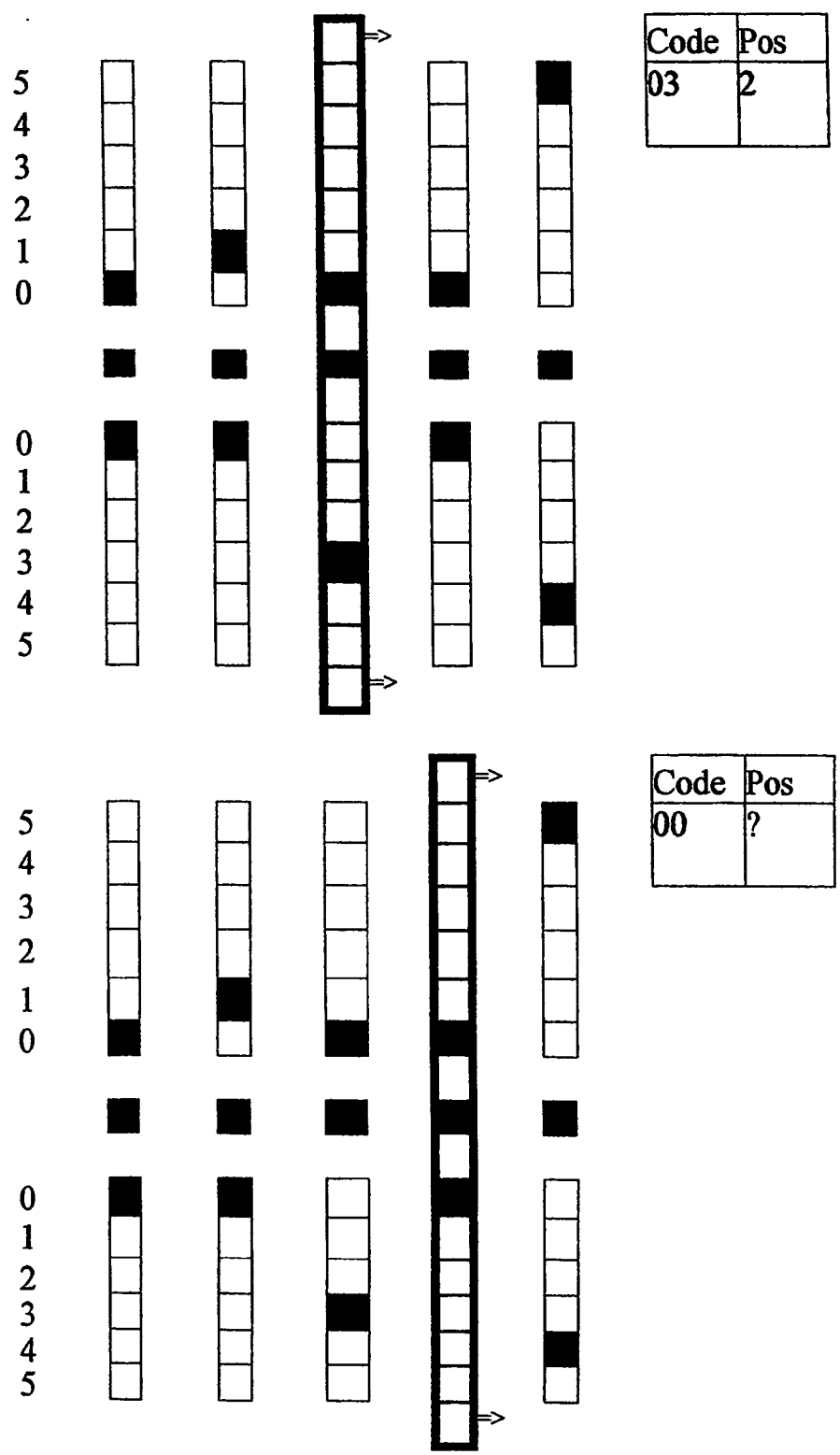
FIG. 15 shows a diagram of a code based on mutual spacing in lateral direction.
Figure 15C:
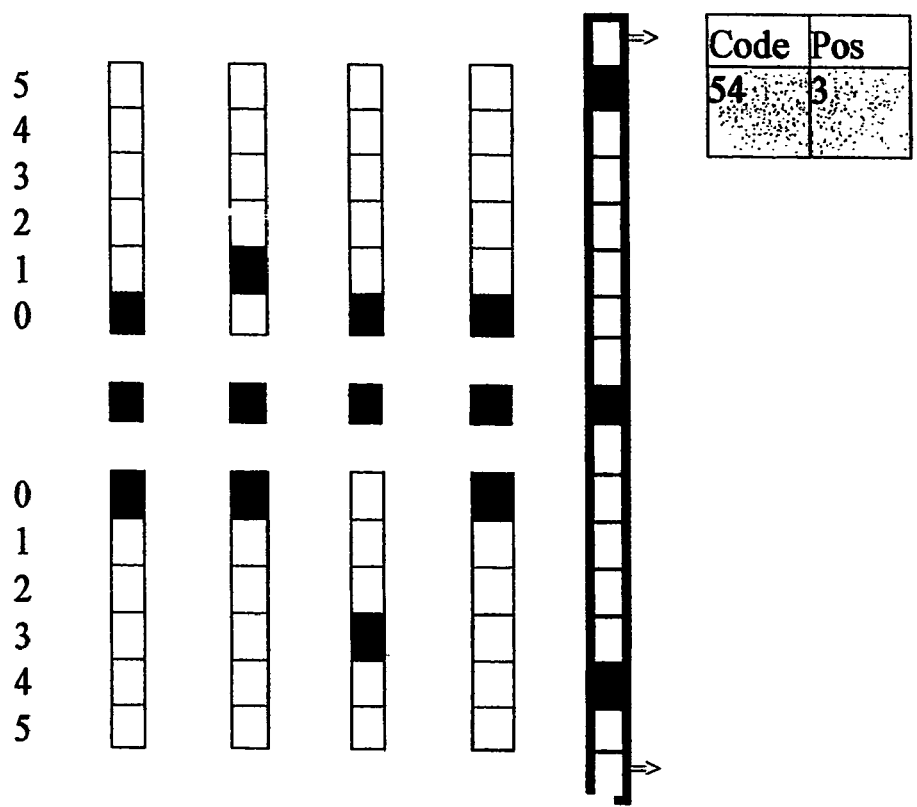
Figure 16:
FIG. 16 shows a diagram of a code based on variable spacing in longitudinal direction.
Figure 17A:
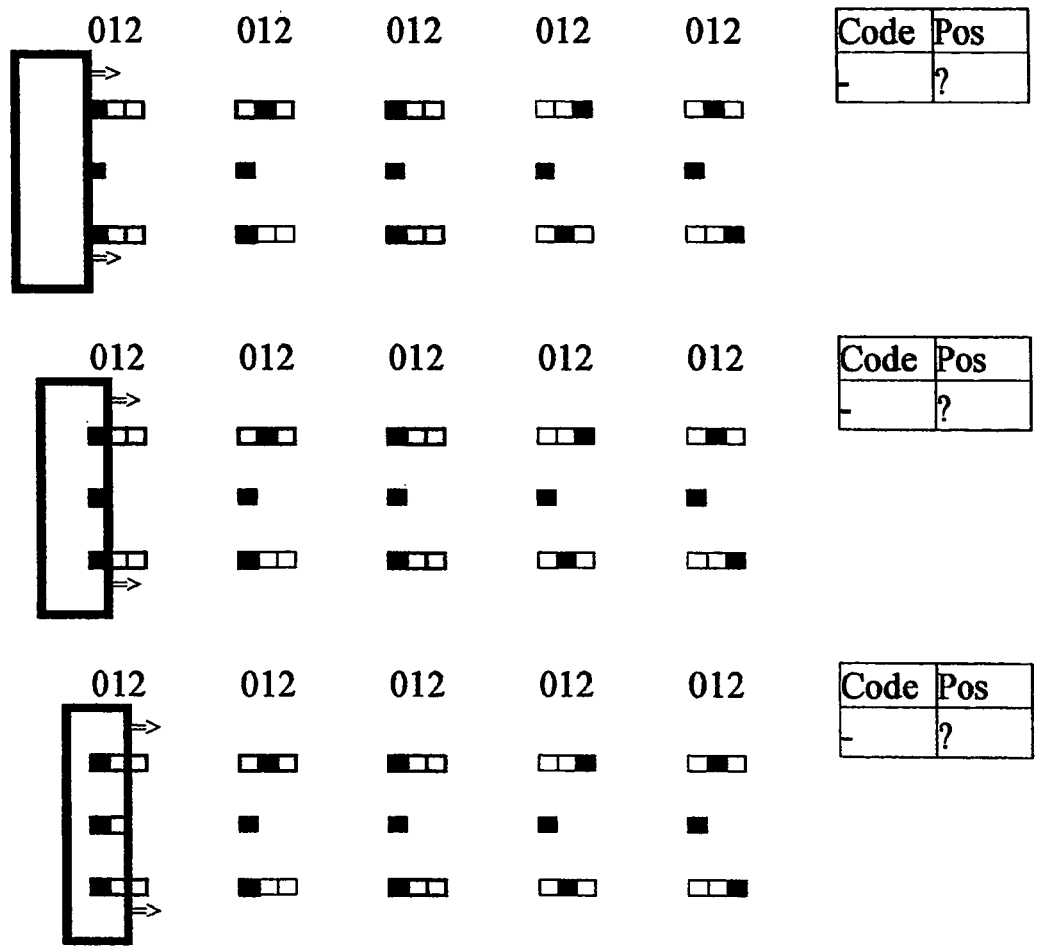
FIG. 17 shows a diagram of a code based on variable spacing in longitudinal direction within one set of magnets.
Figure 17B:
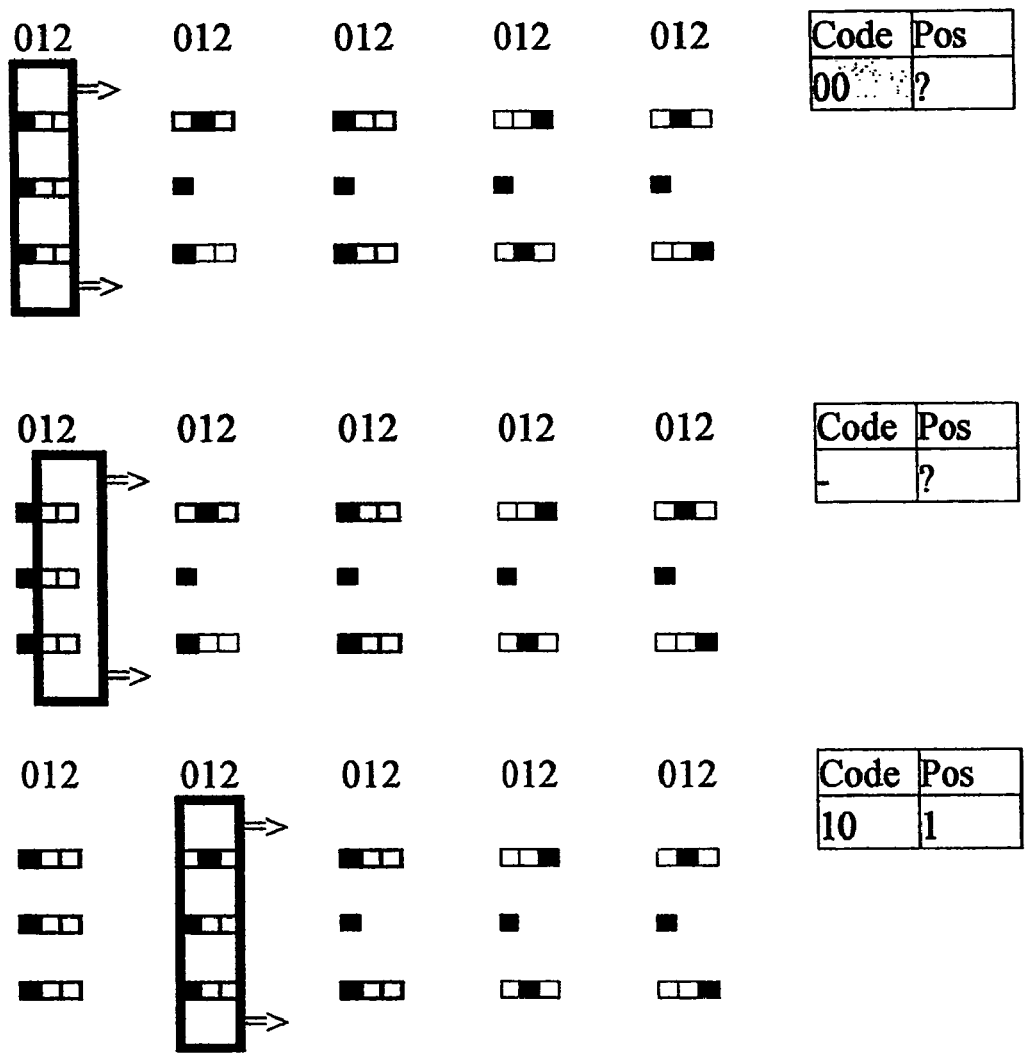
Figure 17C:
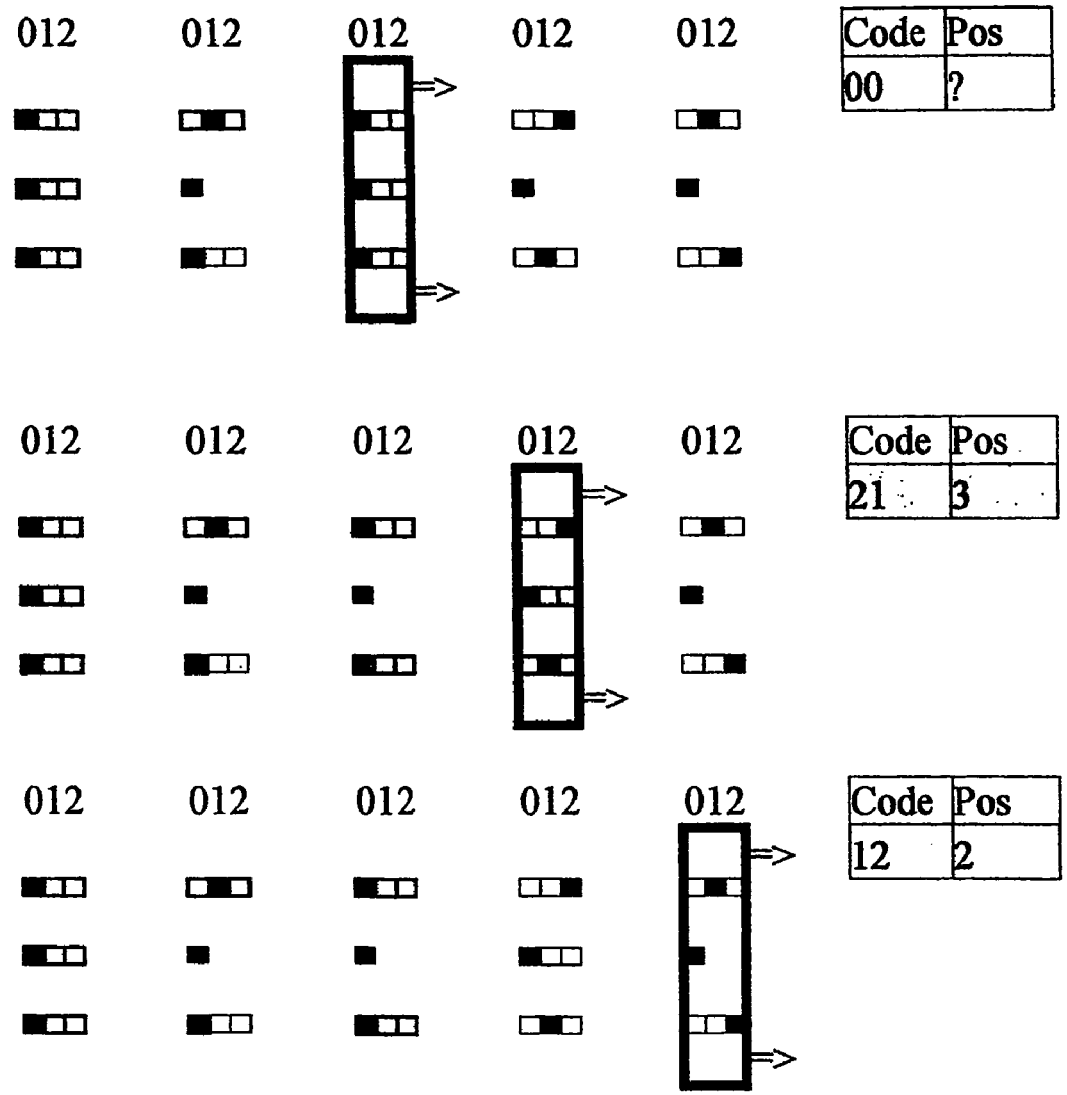
Figure 18A:
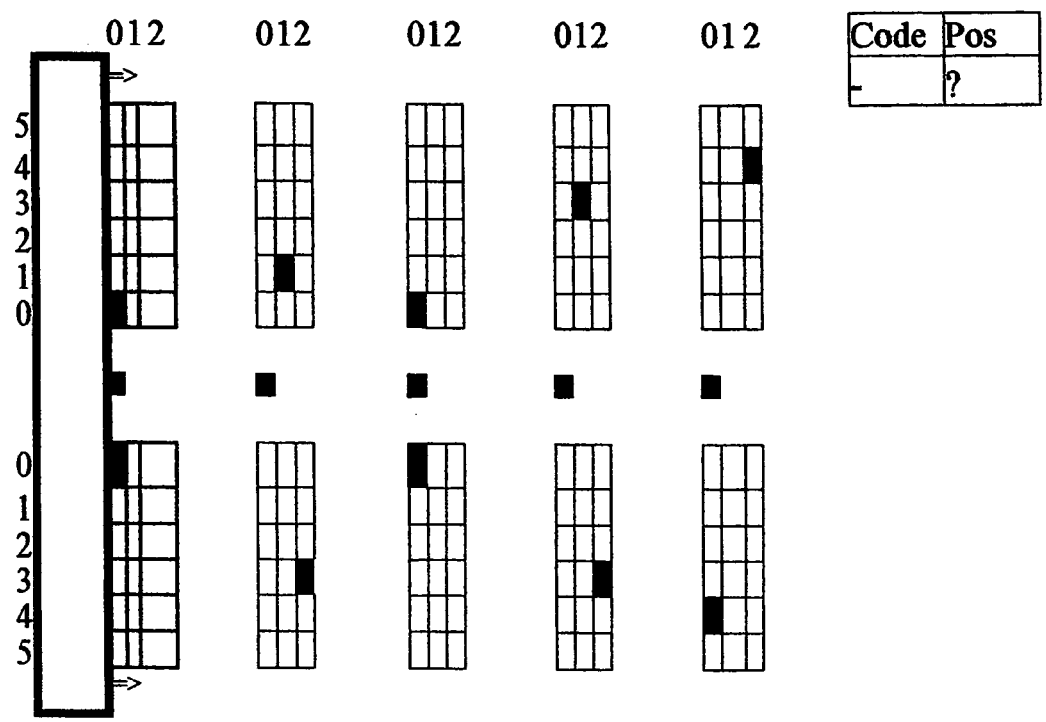
FIG. 18 shows a diagram of a combined code based on variable spacing in both lateral and longitudinal directions.
Figure 18B:
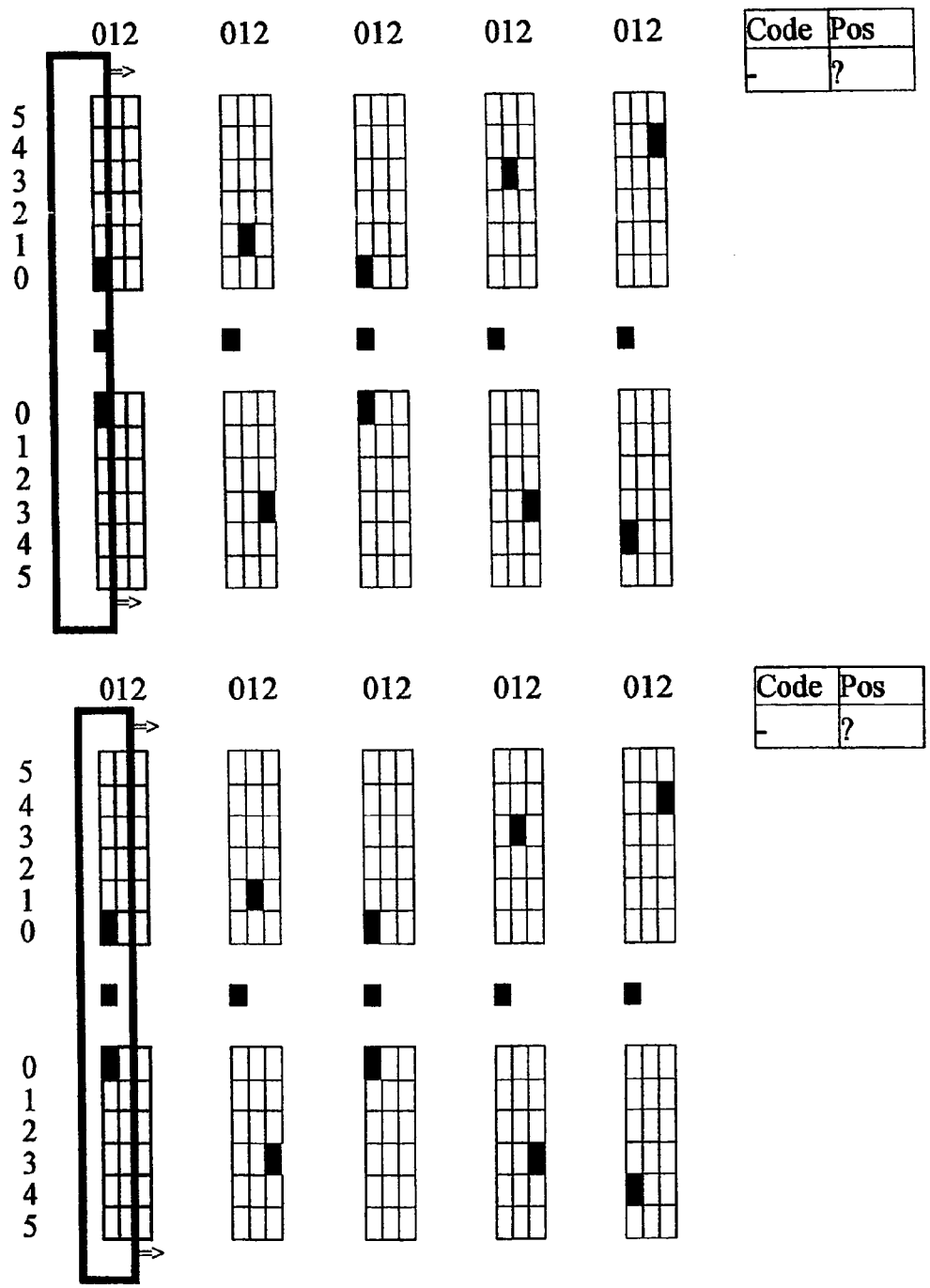
Figure 18C:
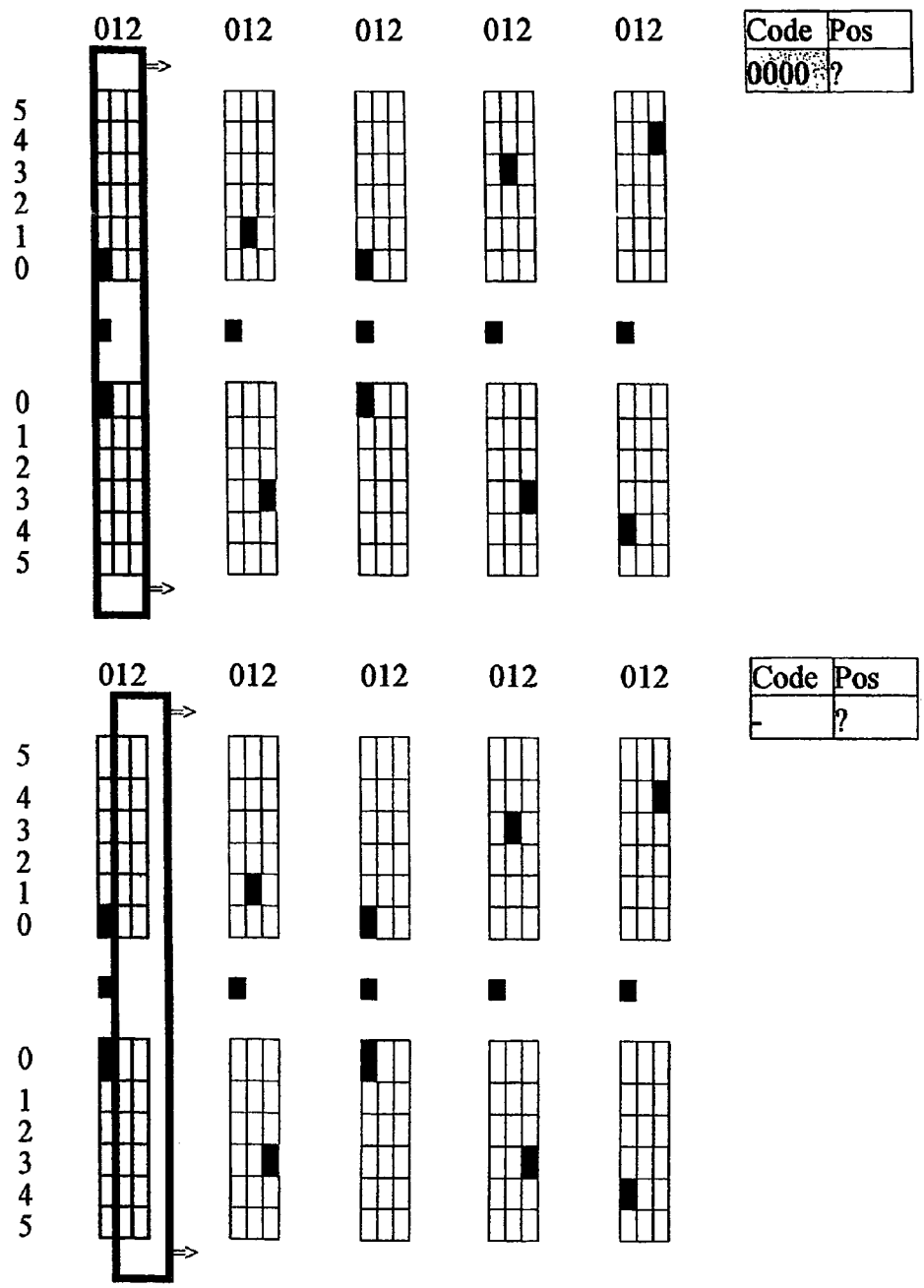
Figure 18D:
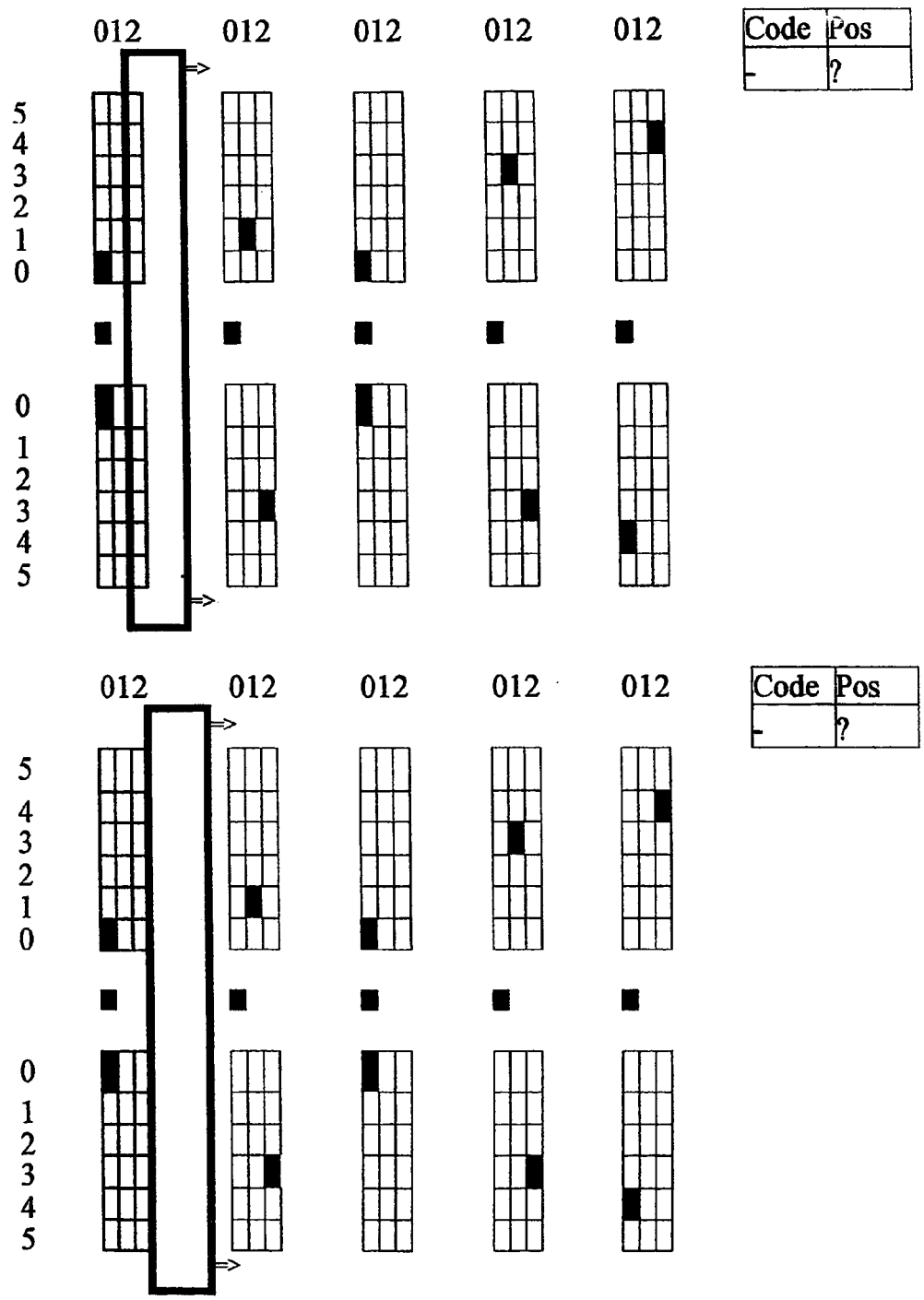
Figure 18E:
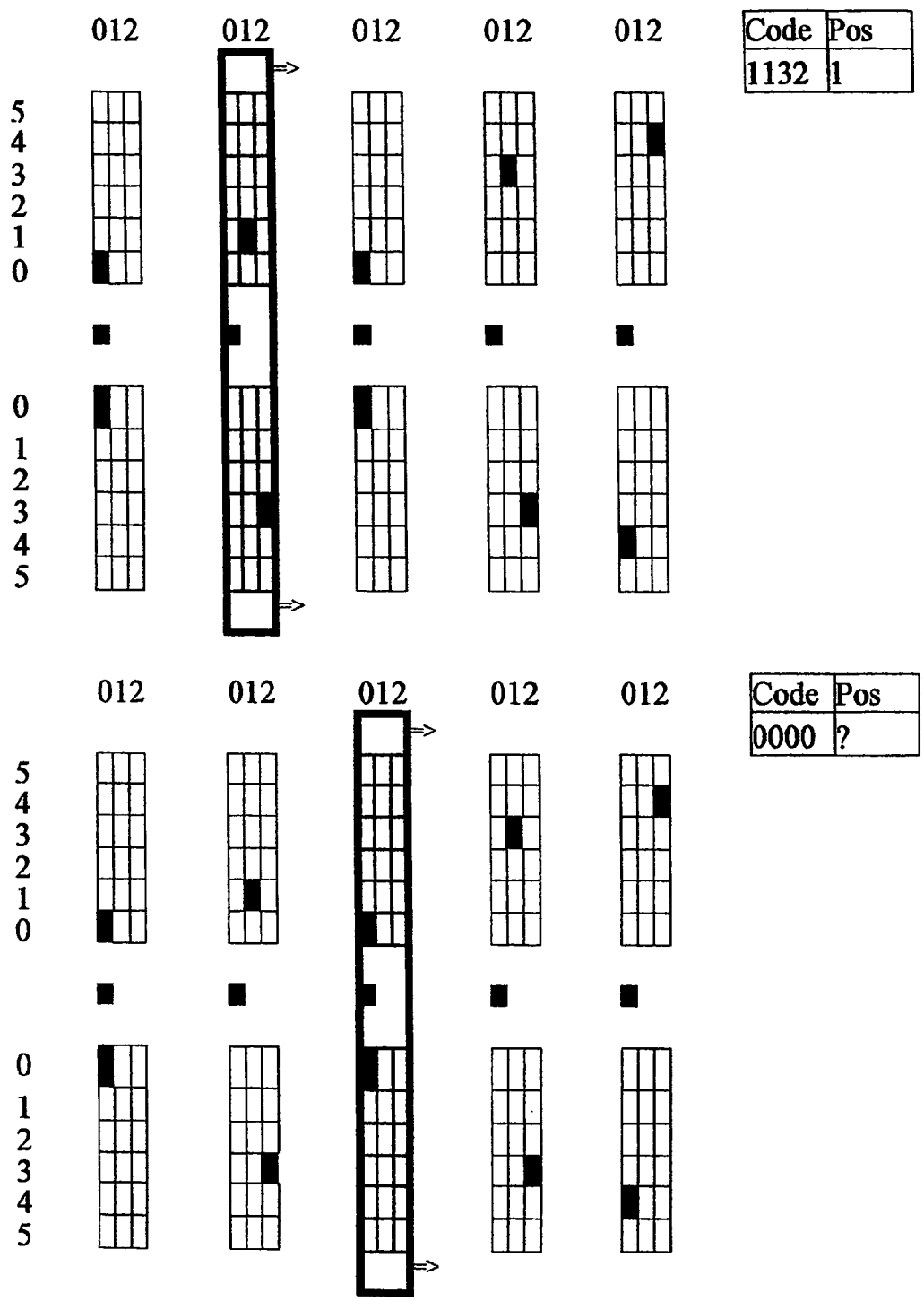
Figure 18F:
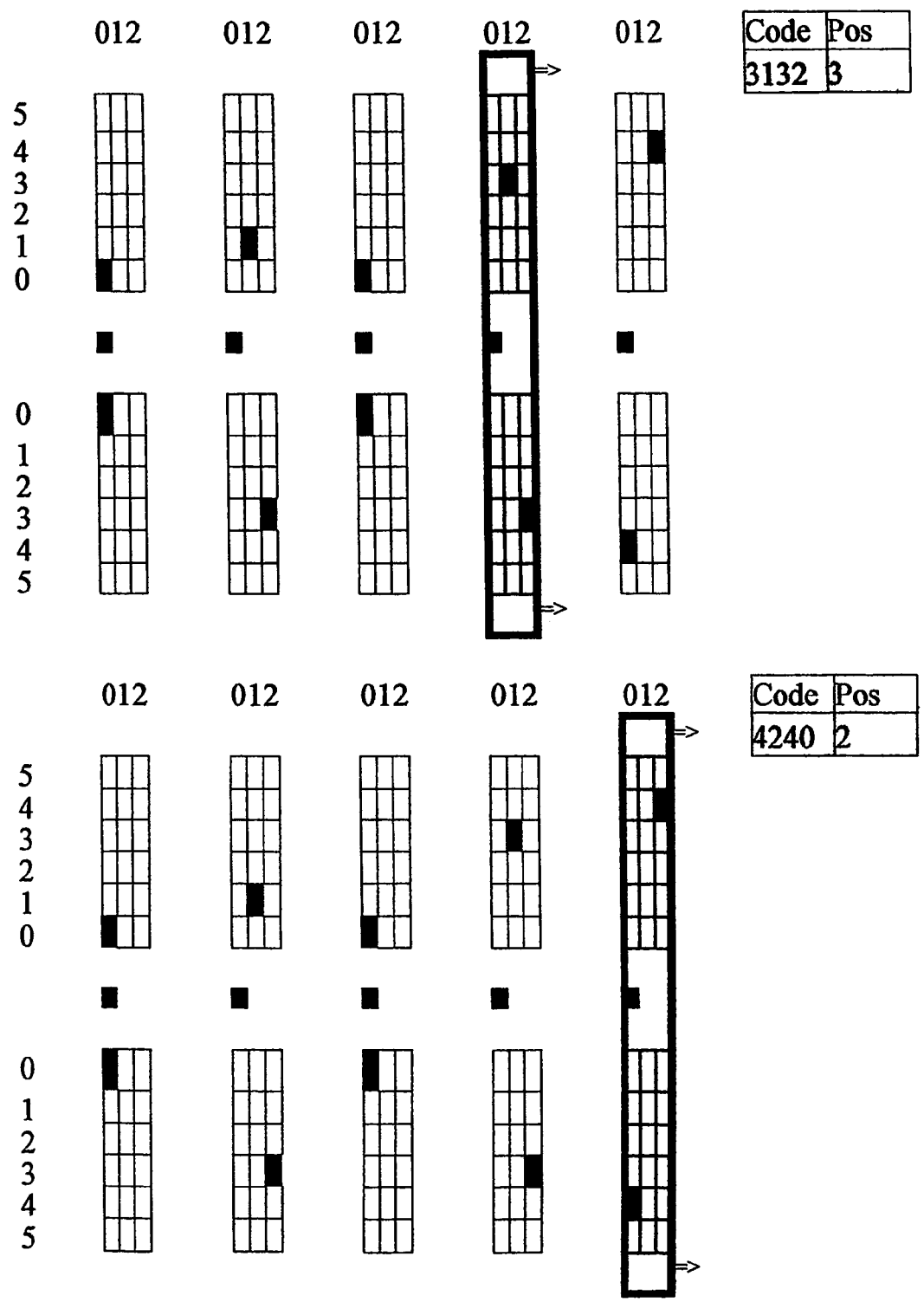

A further coding makes use of the mutual distance between the magnets, which distance variation can be implemented in both lateral and longitudinal directions. The variation in lateral direction can thus be divided into for instance six steps, wherein the minimum mutual distance is chosen such that the magnetic fields do not detectably overlap each other and the chosen step size is related to the detection accuracy of the sensors. Three magnets can thus be combined, wherein one magnet is used as central reference and the two outer magnets are placed at variable distances in six steps (FIG. 15). The number of possible codes is given by $k^m$, with k being the number of steps and m the number of variably placeable magnets, so that 36 codes are possible. The three codes sought each consist of two numbers from 0 to 5, wherein the first number is formed by the magnet to the left of the reference and the second number by the magnet to the right thereof. It is likewise possible to vary the distance between the magnets in the direction of displacement of the vehicle (FIG. 16), wherein sufficient accurate information must be available about the displacement of the vehicle. This information can be supplied for instance via the CAN bus 45 or by the Frog navigation computer. A variation of the above stated longitudinal coding relates to two or more magnets placed adjacently of each other, wherein in a longitudinal direction they are placed slightly offset relative to a central reference, whereby longitudinal coding can also be used within one set of three magnets which are measured (almost) simultaneously (FIG. 17). The positions once again have two-number codes, wherein the first number is formed by the magnet to the left of the central reference and the second number by the magnet to the right thereof. This method has the advantage that no accurate information is required about the displacement of the vehicle.

The above codes can be combined, wherein the lateral and longitudinal mutual distance as well as the orientation of the magnets are used. The number of possible codes can be greatly increased in this manner so that a large number of positions can be uniquely marked. FIG. 18 shows an example wherein the lateral and longitudinal mutual distances are varied relative to a central reference. Three positions are coded here in four numbers, wherein the first two numbers code the position to the left of the reference and the last two numbers code the position to the right thereof, and wherein the first and third number code the lateral distances and the second and fourth number code the longitudinal distances relative to the reference.

The above described preferred embodiment of a vehicle and method for steering thereof provides a system for following a path marked by magnets, wherein a random straight or curved route can be followed relative to these marking elements such that the lateral offset relative to these marking elements can always differ. The system herein measures with equal accuracy over the full width of the vehicle. The system also provides a compact measuring unit which for diverse applications can be arranged at desired heights relative to a ground surface with magnets, wherein the measuring unit can have different ranges and can be suitable for different speeds of movement and accuracies.

The present invention is not limited to the above described embodiment thereof; the rights sought are defined by the following claims, within the scope of which many modifications can be envisaged.

The invention claimed is:

1. Method for steering a vehicle over a ground surface, comprising
    arranging magnetic marking elements at the ground surface at predetermined locations;
    arranging a number of sensors adjacent each other in a transverse direction of the vehicle;
    during travel of the vehicle, measuring only substantially vertical components of the magnetic field in each of the sensors,
    on the basis of the intensities of magnetic field measured by the sensors, estimating the position of the sensors relative to the magnetic marking elements, and thus of the vehicle relative thereto and steering the vehicle based on the estimated position; and
    receiving signals representing a path covered and steering wheel movement of the vehicle to aid in steering the vehicle.

2. Method as claimed in claim 1, wherein the sensors comprise magnetic sensors for measuring the magnetic field.

3. Method as claimed in claim 2, wherein the magnetic sensors are arranged over a considerable part of a width of the vehicle in the transverse direction.

4. Method as claimed in claim 3, wherein the sensors are arranged in a measuring beam having at least 25 sensor elements.

5. Method as claimed in claim 2, wherein the measurements of the sensors are sampled at a rate in the order of magnitude of about 20,000 samples per second to 1,000,000 samples per second.

6. Method as claimed in claim 2, wherein the measuring comprises sampling the vertical component of the magnetic field by means of the magnetic sensors, and analog/digital converting of the measured values, relating the values using estimation techniques to a spatial model of this field component.

7. Method as claimed in claim 2, arranging the magnetic marking elements in the ground surface in a manner such that, by use of at least one of the orientations of and the mutual distance between the elements, unique combinations of the elements are created which represent position information or other information.

8. A method as claimed in claim 4, wherein the measuring beam has about 100 sensor elements.

9. A vehicle including a number of sensor elements arranged mutually adjacently and the sensor elements are operable for measuring intensity of a magnetic field of magnetic marking elements arranged at a ground surface, a computer connected to the sensors on one side and connected on the other side to signals which represent at least one of paths covered and steering wheel movement of the vehicle.

10. A vehicle as claimed in claim 9, wherein the vehicle is an articulated bus provided with respective pairs of front wheels, middle wheels and rear wheels, and at least one of the pairs of wheels being steerable.

11. A vehicle as claimed in claim 9, having a CAN system for obtaining the signals representing the path covered and the steering wheel movement.

12. A vehicle as claimed in claim 9, wherein the computer comprise a microprocessor with associated memory.

13. A vehicle as claimed in claim 9, wherein the computer comprises a scanning part and a fitting part connected to each other.

14. A vehicle as claimed in claim 13, wherein the scanning part comprises an analog/digital converter for converting infonnation obtained from the sensors.

15. A vehicle as claimed in claim 9, wherein the computer is operable to recognize combinations in the intensities of magnetic field measured by the sensor elements.

16. A vehicle as claimed in claim 9, wherein the vehicle has pairs of wheels and at least one of the pairs of wheels is steerable.

17. A system for measuring the position of a magnet relative to a number of sensor elements arranged at predetermined mutual distances, the system comprising the magnet and the number of sensor elements arranged at predetermined mutual distances; wherein the sensor elements sense a substantially vertical component of the intensity of a magnetic field during passage of the sensor elements over the magnet, and means connected and operable to estimate the position of the magnet relative to the sensor elements on the basis of signals coming from the sensor elements.

18. A system as claimed in claim 17, wherein the magnetic marking elements are arranged at a ground surface in a manner for making use of at least one of the orientations of and the mutual distance between the elements, for creating unique combinations which represent position information or other information.

* * * * *